(12) United States Patent
Aunkst et al.

(10) Patent No.: US 11,198,484 B2
(45) Date of Patent: Dec. 14, 2021

(54) ASSEMBLY STRUCTURE AND METHOD FOR ELECTRIC VEHICLE

(71) Applicant: Harley-Davidson Motor Company Group, LLC, Milwaukee, WI (US)

(72) Inventors: David Isaac Aunkst, St Francis, WI (US); Curt Zackiewicz, Milwaukee, WI (US); Ronald Hurth, Beaver Dam, WI (US); Brandon James Deaner, Bayside, WI (US); Brian M. Scherbarth, Menomonee Falls, WI (US); Eric James Klumpp, Grafton, WI (US); Senthilkumar Vijayakumar, Menomonee Falls, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 374 days.

(21) Appl. No.: 16/521,952

(22) Filed: Jul. 25, 2019

(65) Prior Publication Data
US 2020/0031425 A1    Jan. 30, 2020

Related U.S. Application Data

(60) Provisional application No. 62/711,644, filed on Jul. 30, 2018.

(51) Int. Cl.
*B62K 25/28* (2006.01)
*B60L 50/64* (2019.01)
(Continued)

(52) U.S. Cl.
CPC ............... *B62K 25/28* (2013.01); *B60K 1/00* (2013.01); *B60K 17/04* (2013.01); *B60L 50/64* (2019.02);
(Continued)

(58) Field of Classification Search
CPC .... B62K 25/28; B62K 11/04; B62K 2204/00; B60L 50/64; B60L 2200/12; B60K 17/04; B60Y 2200/12
See application file for complete search history.

(56) References Cited

U.S. PATENT DOCUMENTS

| 3,165,163 A | 1/1965 | Holka |
| 5,477,936 A | 12/1995 | Sugioka et al. |

(Continued)

FOREIGN PATENT DOCUMENTS

| EP | 0539269 A1 | 4/1993 |
| EP | 1555201 A1 | 7/2005 |

(Continued)

*Primary Examiner* — Tony H Winner
(74) *Attorney, Agent, or Firm* — Michael Best & Friedrich LLP (57) ABSTRACT

An electric vehicle includes a battery having a housing. The housing includes a rear side which is defined as a side facing away from a forward travelling direction of the electric vehicle. The electric vehicle further includes a frame, a motor having a housing, and a pivot shaft stack-up assembly co-aligned along a pivot shaft axis. The pivot shaft stack-up assembly includes first and second portions of the frame, a swingarm extending therebetween, and an idler bracket. A shock mount is integral with the battery housing. The shock mount extends from the rear side of the battery housing. The battery housing is configured as a stressed chassis member in which each of the motor housing, the frame, and the pivot shaft stack-up assembly are aligned thereof. The shock mount provides a path along which a load is directed to the battery housing.

20 Claims, 10 Drawing Sheets

(51) Int. Cl.
*B60K 17/04* (2006.01)
*B60K 1/00* (2006.01)
*B62K 11/04* (2006.01)

(52) U.S. Cl.
CPC ........... *B62K 11/04* (2013.01); *B60L 2200/12* (2013.01); *B60Y 2200/12* (2013.01); *B62K 2204/00* (2013.01)

(56) References Cited

U.S. PATENT DOCUMENTS

| | | | |
|---|---|---|---|
| 5,613,569 | A | 3/1997 | Sugioka et al. |
| 7,255,191 | B2 | 8/2007 | Baldwin et al. |
| 8,672,077 | B2 * | 3/2014 | Sand .................. B62K 25/00 180/220 |
| 9,010,476 | B2 * | 4/2015 | Matsuda ............. B62K 25/283 180/220 |
| 9,085,342 | B2 | 7/2015 | Jauvtis |
| 9,130,693 | B2 | 9/2015 | Rexnik et al. |
| 9,211,934 | B2 * | 12/2015 | Eguchi ................ B62K 25/283 |
| 9,290,226 | B2 | 3/2016 | Nitta |
| 9,308,957 | B2 | 4/2016 | Matsuda |
| 9,327,586 | B2 * | 5/2016 | Miyashiro ............. B62K 11/04 |
| 9,346,421 | B2 | 5/2016 | Miyashiro |
| 9,434,445 | B1 | 9/2016 | Jauvtis |
| 9,545,968 | B2 * | 1/2017 | Miyashiro ............. B62K 21/00 |
| 9,660,236 | B2 | 5/2017 | Kondo et al. |
| 9,669,898 | B2 | 6/2017 | Miyashiro |
| 9,960,236 | B2 | 5/2018 | Girdhar et al. |
| 2005/0211481 | A1 * | 9/2005 | Sasamoto ............. B60K 6/48 180/65.225 |
| 2010/0018787 | A1 * | 1/2010 | Plazotta .............. B60L 50/60 180/65.6 |
| 2011/0036657 | A1 * | 2/2011 | Bland .................. B60L 50/64 180/220 |
| 2015/0122563 | A1 * | 5/2015 | Kondo ................. H01M 10/655 180/68.5 |
| 2015/0210339 | A1 | 7/2015 | Igarashi |
| 2015/0314830 | A1 * | 11/2015 | Inoue .................. B60K 1/00 180/220 |
| 2015/0329174 | A1 | 11/2015 | Inoue |
| 2015/0329175 | A1 | 11/2015 | Inoue |
| 2015/0344093 | A1 * | 12/2015 | Inoue .................. B62M 7/04 180/220 |
| 2016/0280306 | A1 | 9/2016 | Miyashiro et al. |
| 2016/0288860 | A1 | 10/2016 | Tani et al. |

FOREIGN PATENT DOCUMENTS

| | | |
|---|---|---|
| EP | 2643202 B1 | 7/2015 |
| FR | 3035046 A1 | 10/2016 |
| JP | 3036097 | 4/2000 |
| JP | 3258049 | 2/2002 |
| JP | 3602494 | 12/2004 |
| JP | 5430776 | 12/2013 |
| JP | 2015068753 | 4/2015 |
| JP | 2016003953 | 1/2016 |
| JP | 6184437 | 11/2016 |
| JP | 2016210328 | 12/2016 |
| JP | 2017178268 | 10/2017 |
| WO | WO2018010669 A1 | 1/2018 |

* cited by examiner

ASSEMBLY STRUCTURE AND METHOD FOR ELECTRIC VEHICLE

CROSS-REFERENCE TO RELATED APPLICATIONS

This application claims priority to U.S. Provisional Patent Application No. 62/711,644 filed on Jul. 30, 2018, the entire contents of which are incorporated herein by reference.

FIELD OF THE INVENTION

The present invention relates to an electric vehicle, and more specifically to assembly of a frame, a battery, and a motor of the electric vehicle.

SUMMARY OF THE INVENTION

The present invention provides, in one aspect, an electric vehicle including a battery having a housing. The housing includes a plurality of sides. The plurality of sides includes a rear side which is defined as a side facing away from a forward travelling direction of the electric vehicle. The electric vehicle further includes a frame having at least one frame member coupled to the battery housing, and a motor and gear box positioned below the battery. The motor includes a housing. The electric vehicle further includes a pivot shaft stack-up assembly co-aligned along a pivot shaft axis. The pivot shaft stack-up assembly includes first and second portions of the frame, and a swingarm extending therebetween. A pivot shaft extending through the pivot shaft stack-up assembly along the pivot shaft axis for supporting the swing arm. A shock mount is formed as an integral extension from the rear side of the battery housing to support a rear shock coupled to the swingarm. The battery housing is configured as a stressed chassis member, the shock mount providing a path along which loads from the rear shock are directed to the battery housing.

The present invention provides, in another aspect, an electric vehicle including a battery having a housing at least partially enclosing the battery. The battery housing includes a bottom side, and a first projection extending from the battery housing. The electric vehicle further includes a motor having an output defining a longitudinal axis. A housing of the motor includes a second projection extending from the housing toward the battery. The longitudinal axis is parallel to a front-to-rear direction of the electric vehicle. The first projection engages with the second projection during assembly such that the battery housing is automatically located onto the motor housing at a predetermined fixed position in the front-to-rear direction.

The present invention provides, in yet another aspect, an electric vehicle including a battery having a housing at least partially enclosing the battery. The battery housing includes a bottom side, and a first projection extending from the battery housing. The electric vehicle further includes a motor having an output defining a longitudinal axis. A housing of the motor includes a second projection extending from the housing toward the battery. A set screw is positioned at a joint formed between the first and second projections. A fastener is insertable through the first projection and the second projection along a fastener axis that is perpendicular to the longitudinal axis. The longitudinal axis is parallel to a front-to-rear direction of the electric vehicle, and the fastener axis defines a side-to-side direction of the electric vehicle. The set screw provides a tolerance adjustment mechanism that is adjustable for adjusting a width of the battery housing relative to a width of the motor housing in the side-to-side direction. The tolerance adjustment mechanism is separate from a fastener torque of the fastener.

The present invention provides, in yet still another aspect, a method for assembly of an electric vehicle. The method includes providing the electric vehicle including a battery having a housing, a frame including first and second side portions and an intermediate portion, a motor and gear box positioned below the battery, and a pivot shaft assembly having a pivot shaft, an idler sprocket, an idler bracket, and a swing arm. In a first step, the method includes positioning the frame around the battery housing and loosely coupling the frame to the battery housing by fastening at least one of the side portions to the battery housing. In a second step, the method includes tightening a connection between the first and second side portions and the intermediate portion after the first step. In a third step, the method includes installing the pivot shaft through the idler sprocket, the idler bracket, the swing arm, and an end of each of the first and second side portions of the frame after the second step. In a fourth step, the method includes tightening the coupling between the frame and the battery housing after the third step.

Other features and aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
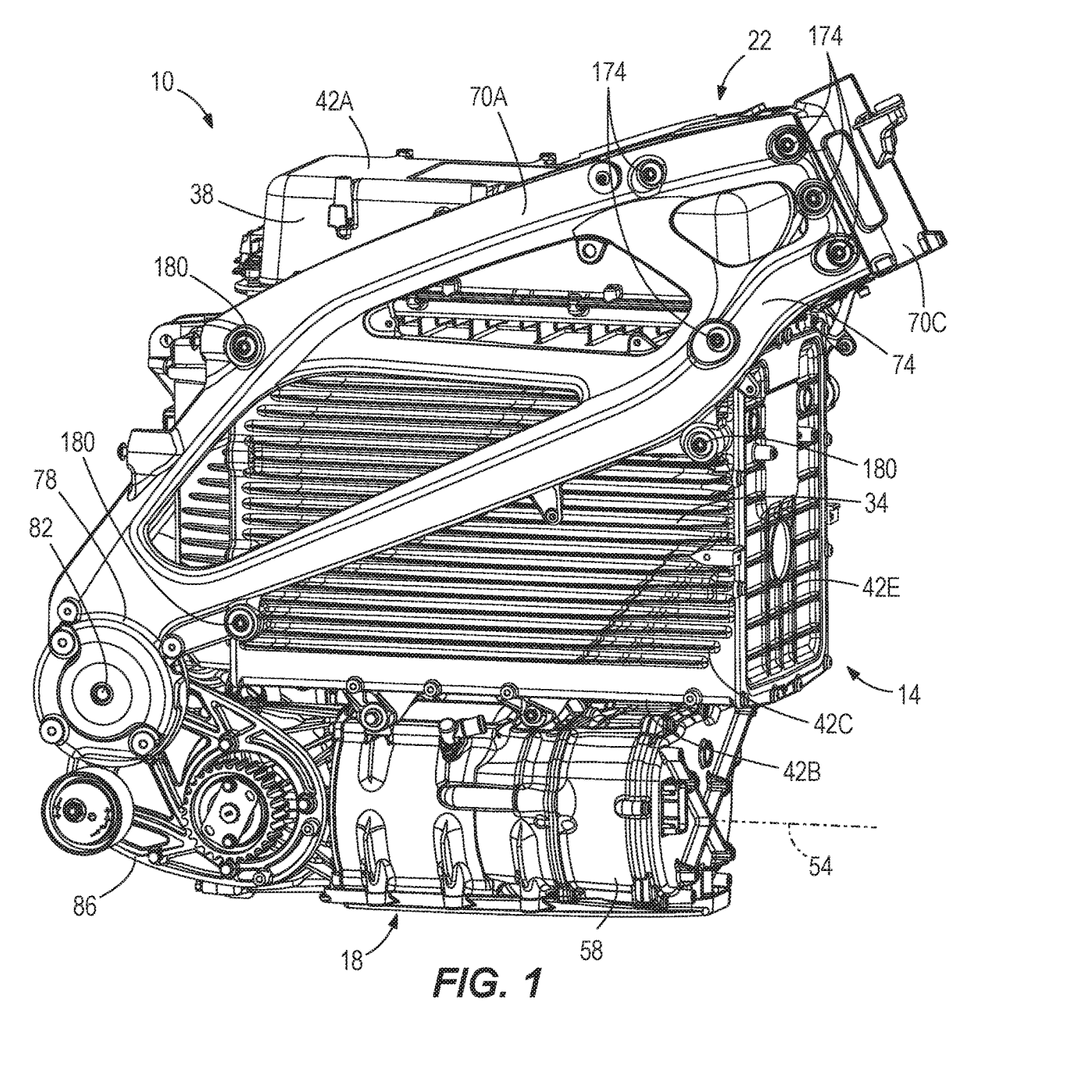
FIG. 1 is a perspective view of a portion of an electric vehicle subassembly including a frame, a battery housing, a motor housing, and a pivot shaft assembly.
Figure 12:
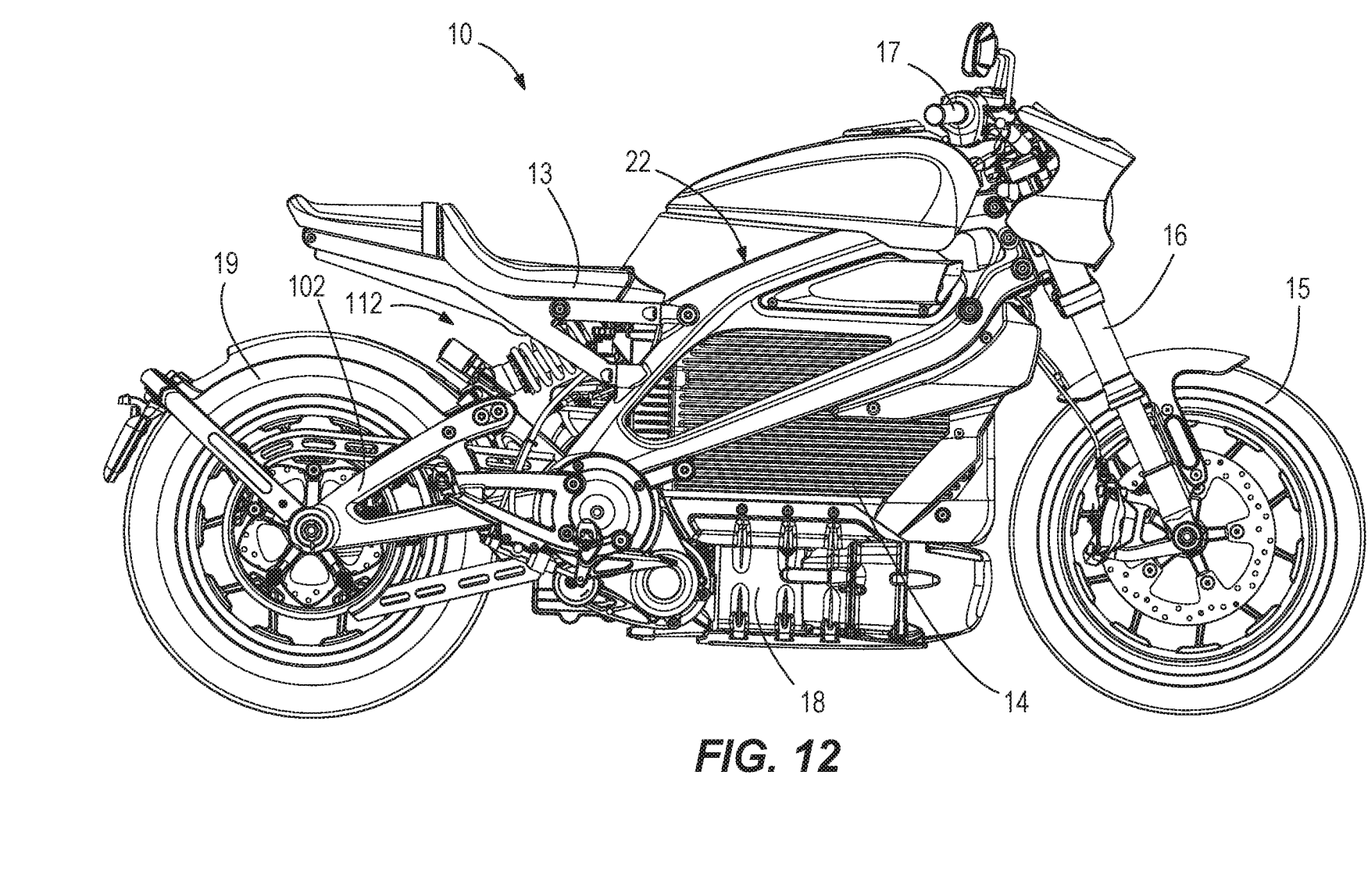
FIG. 12 is a side view of the electric vehicle.

FIG. 1 illustrates a portion of an electric vehicle 10, shown completely in FIG. 12. The electric vehicle 10, which is a motorcycle in the illustrated construction (e.g., having a straddle seat 13, a single front wheel 15 supported by a fork 16 and steerable with handlebars 17, and a single rear wheel 19 aligned with the front wheel 15 and supported by a rear swing arm 102), includes a battery housing 14, a motor housing 18 positioned below the battery housing 14, and a frame 22 partially surrounding the battery housing 14. The electric vehicle 10 further includes a pivot shaft assembly or stack-up 26. The battery housing 14, the motor housing 18, the frame 22, and the pivot shaft stack-up 26 are all components that form at least a subassembly of the electric vehicle 10. Although illustrated as a motorcycle herein, aspects of the disclosure may be used on other electric vehicles, such as automobiles, all-terrain vehicles, and the like.

Figure 9:
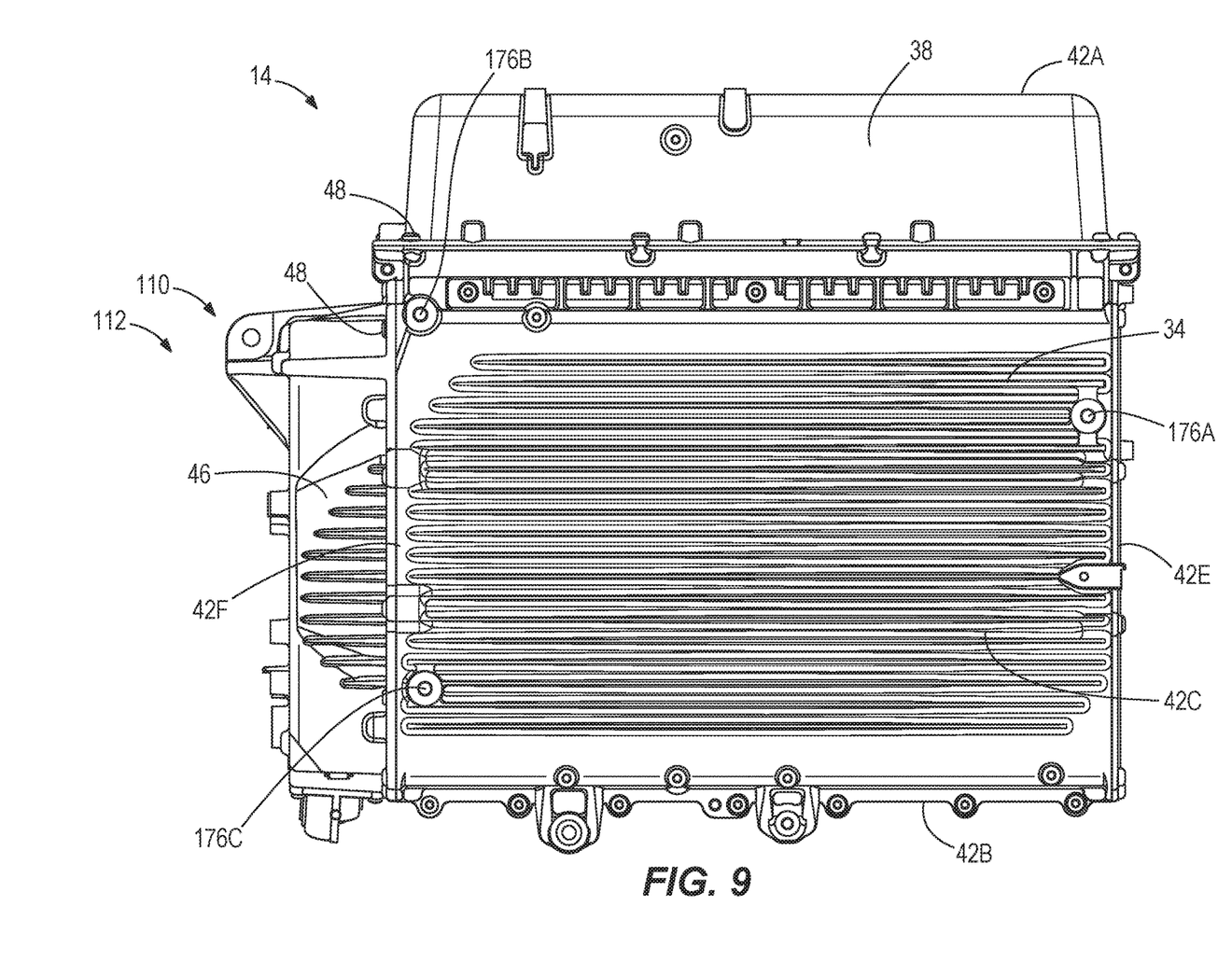
FIG. 9 is a side view of the battery housing of FIG. 1.

With reference to FIGS. 1 and 9, the battery housing 14 includes a plurality of portions 34, 38 forming a case. The illustrated battery housing 14 includes a main portion 34 and a top portion 38 positioned adjacent an end of the main portion 34. In other embodiments, the battery housing 14 may be formed by a single piece. The main and top portions 34, 38 define a plurality of sides 42A-F of the battery housing 14. In the illustrated embodiment, the battery housing 14 includes a top side 42A (i.e., top portion 38), a bottom side 42B opposite the top side 42A, first and second lateral sides 42C, 42D extending between the top and bottom sides 42A, 42B, and front and rear sides 42E, 42F extending between the top and bottom sides 42A, 42B (only the top side 42A, the first lateral side 42C, and the front side 42E are shown in FIG. 1). Furthermore, the illustrated battery housing 14 includes a rear portion 46 (FIG. 9) secured to the rear side 42F of the main portion 34. The top portion 38 and the rear portion 46 may be secured to the main portion 34 such as by fasteners (e.g., screws 48). The battery housing 14 is configured to receive an electric battery (e.g., lithium-ion, etc.) for supplying power to the electric vehicle 10. The battery housing 14 is configured to at least partially enclose the battery.

Figure 2:
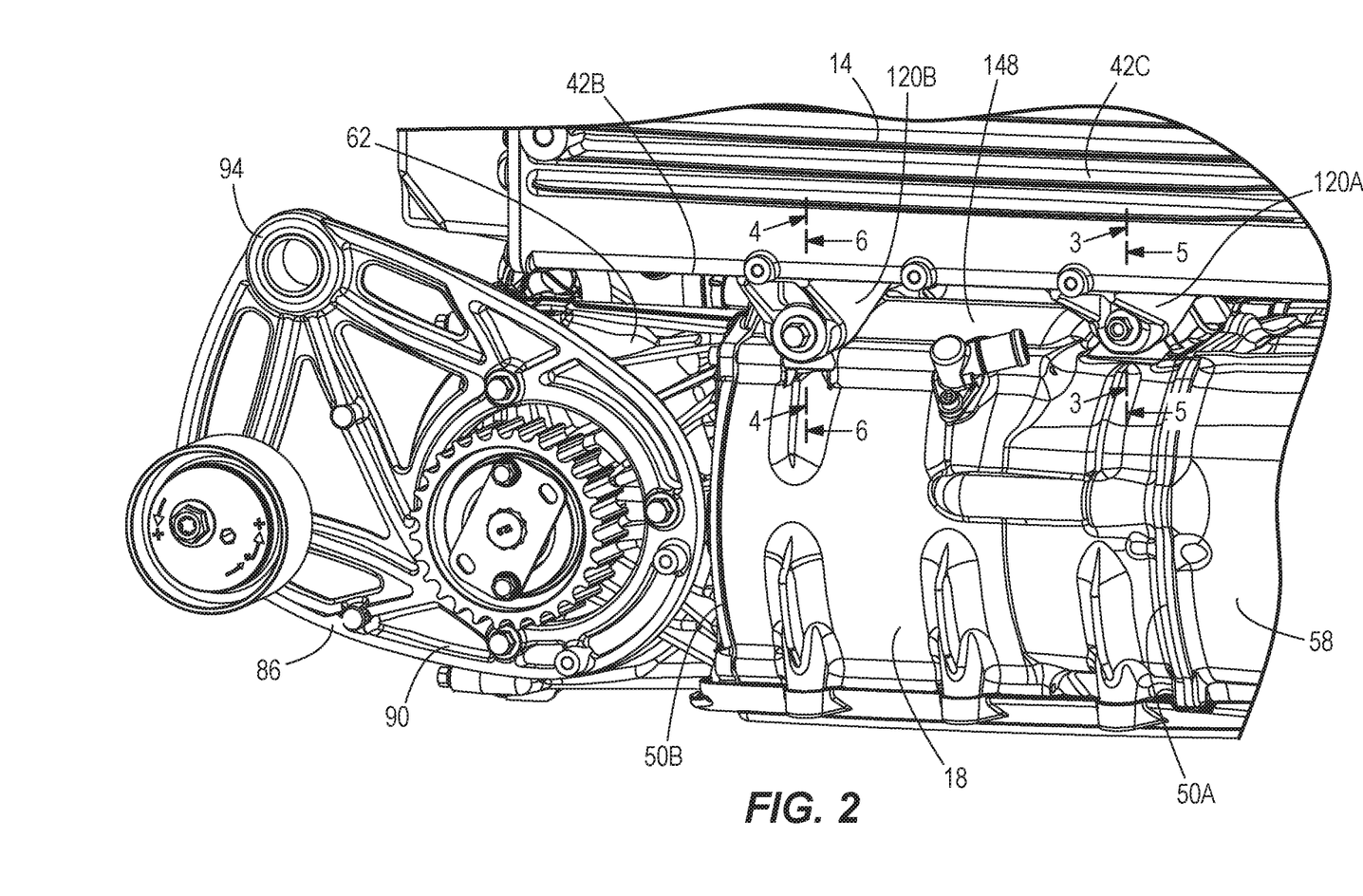
FIG. 2 is an enlarged perspective view of a connection between the battery housing, the motor housing, and the pivot shaft assembly of FIG. 1.

With reference to FIGS. 1 and 2, the motor housing 18 is positioned below the bottom side 42B of the battery housing 14. The motor housing 18 includes a first end 50A and a second, opposite end 50B. The motor housing 18 receives an electric motor that receives the power supplied by the battery. In some embodiments, the electric motor is an AC electric motor. A rotary output (not shown) of the motor extends between the first and second ends 50A,50B. The rotary output defines a longitudinal axis 54 of the electric vehicle 10. As such, the longitudinal axis 54 may be further defined as extending past one or both of the front and rear sides 42E, 42F of the battery housing 14. The longitudinal axis 54 extends in (i.e., parallel to) a front-to-rear direction of the electric vehicle. As discussed further below, the motor housing 18 may not have a mounting directly to the frame 22, but rather indirectly to the frame 22 through one or more components such as the battery housing 14, which acts as a stressed member in conjunction with the frame 22. As such, the vehicle 10 can include specialized assembly features and processes to ensure proper orientation of the battery housing 14 and the motor housing 18 relative to the chassis, without inducing undue stress in the components during tightening of numerous joints between the components.

In the illustrated embodiment, an inverter/controller housing 58 (FIG. 2) is positioned adjacent the first end 50A of the motor housing 18, and a gear box housing 62 is positioned adjacent the second end 50B of the motor housing 18. The inverter/controller housing 58 and the gear box housing 62 are each below the battery housing 14. The inverter/controller housing 58 is configured to receive an inverter for converting DC current generated by the battery into AC current for supplying the power to the motor. In addition, the inverter/controller housing 58 includes a controller (not shown) for controlling operation of the battery and the motor. The gear box housing 62 is configured to receive a gear box. The gear box can reorient the rotational output (e.g., 90 degrees by bevel gearset) and/or provide an increase or decrease in rotary output speed (with a reciprocal decrease or increase in torque) from the rotary output of the motor for driving the rear wheel of the electric vehicle 10 via a drive train element (e.g., a sprocket for a belt or chain, a shaft, a gear, etc.).

Figure 7:
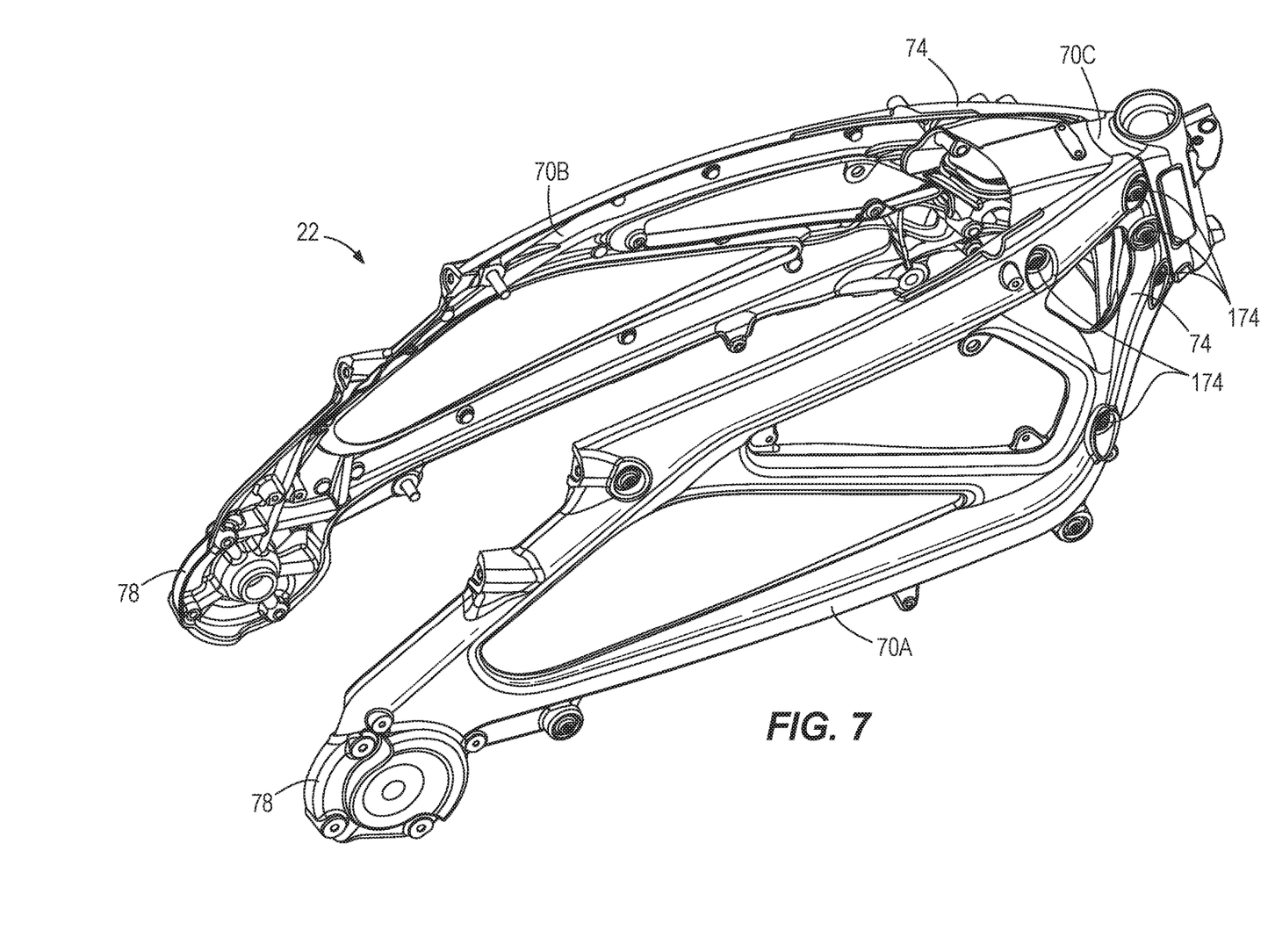
FIG. 7 is a perspective view of the frame of FIG. 1.

With reference to FIGS. 1 and 7, the frame 22 includes a plurality of portions 70A-C. In the illustrated embodiment, the frame 22 includes a first side portion 70A, a second side portion 70B, and an intermediate portion 70C forming a steering head. In other embodiments, the frame 22 may include one or more portions. The first and second side portions 70A, 70B are positioned on the first and second sides 42C, 42D, respectively, of the battery housing 14. The intermediate portion 70C is positioned in front of the front side 42E of the battery housing 14 along the longitudinal axis 54. The intermediate portion 70C is securably coupled between front end portions 74 of the first and second side portions 70A, 70B. The illustrated intermediate portion 70C is positioned proximate the top side 42A of the battery housing 14. Furthermore, the first and second side portions 70A, 70B extend from the respective front end portion 74 to respective rear ends portions 78. In the illustrated embodiment, the rear end portions 78 each extend past the rear side 42F of the battery housing 14 along the longitudinal axis 54. In addition, the illustrated rear end portions 78 are positioned proximate the bottom side 42B of the battery housing 14.

Figure 11:
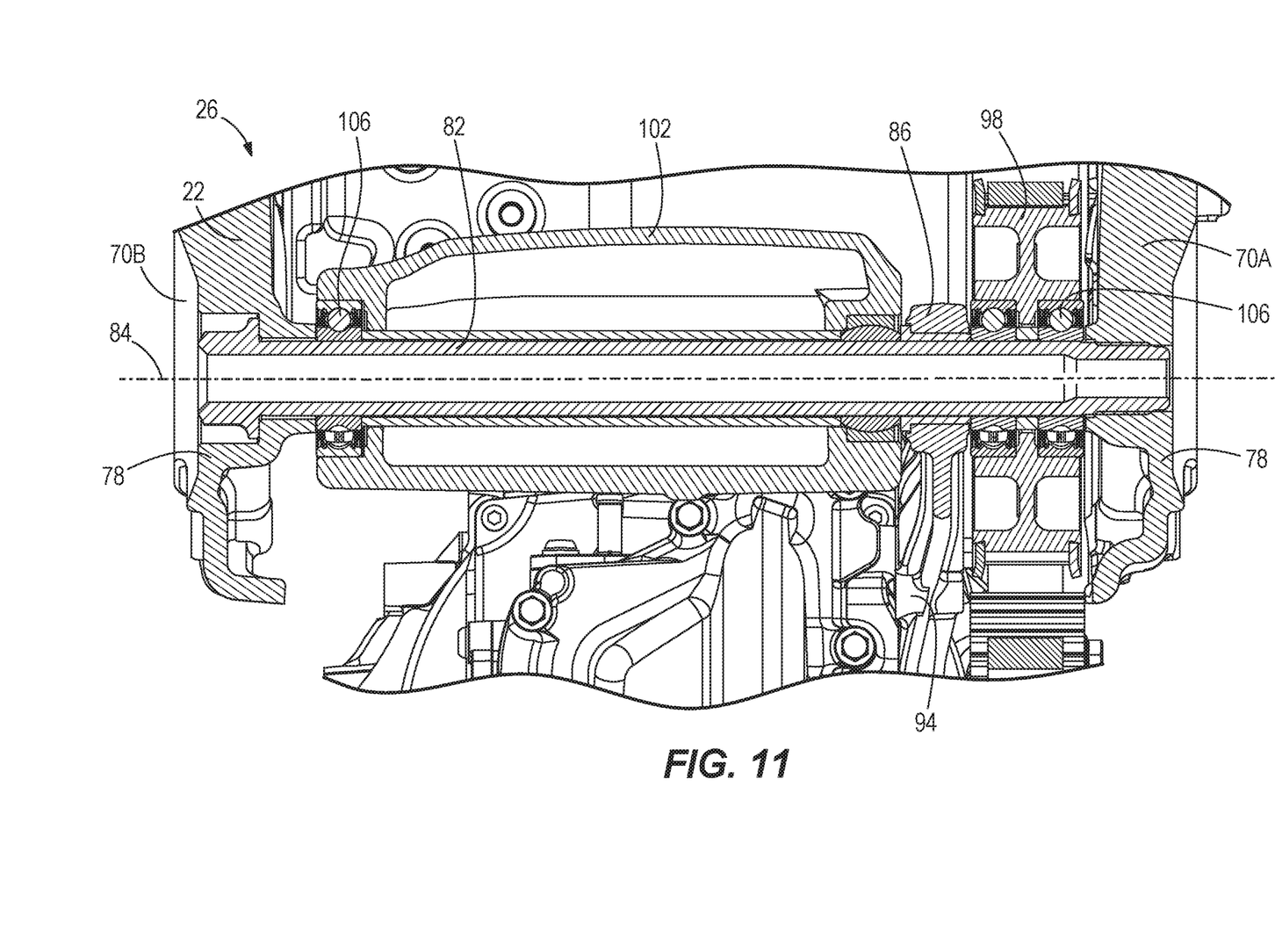
FIG. 11 is a cross-sectional view of the pivot shaft assembly of FIG. 1.

With reference to FIG. 11, the pivot shaft stack-up 26 includes a plurality of components that are co-aligned along a pivot shaft axis 84 to receive the pivot shaft 82 that mounts the swingarm 102 to the frame 22. Among the pivot shaft stack-up 26 are the side portions of the frame 70A, 70B, the swingarm 102 therebetween, and an idler bracket 86 positioned between a right hand side of the swingarm 102 and an inboard (left) side of the right hand frame side portion 70A. The illustrated idler bracket 86 extends between the pivot shaft 82 and the gear box housing 62. Specifically, a first section 90 of the idler bracket 86 is assembled with the gear box housing 62 (FIG. 2), and a second section 94 of the idler bracket 86 extends from the first section 90 toward the rear end portion 78 of the first side portion 70A of the frame 22 (FIG. 11). The pivot shaft 82 extends through each of the rear end portions 78 of the frame 22 and the idler bracket 86. The idler bracket 86 is included in the pivot shaft stack-up 26 to provide motor torque transfer support from the motor to the frame 22. In addition, the idler bracket 86 included in the pivot shaft stack-up 26 provides stiffness to the electric vehicle subassembly. With particular reference to FIG. 11, the pivot shaft stack-up 26 further includes an idler sprocket 98. The illustrated idler sprocket 98 is positioned between the second section 94 of the idler bracket 86, and the rear end portion 78 of the first frame side portion 70A. As shown in FIG. 11, the swingarm 102 is positioned between the second section 94 of the idler bracket 86 and the rear end portion 78 of the second side portion 70B. The swingarm 102 and sprocket 98 include respective bearings 106. In addition, the illustrated swingarm 102 includes spacers. In other embodiments, the pivot shaft stack-up 26 may have other configurations.

Figure 10:
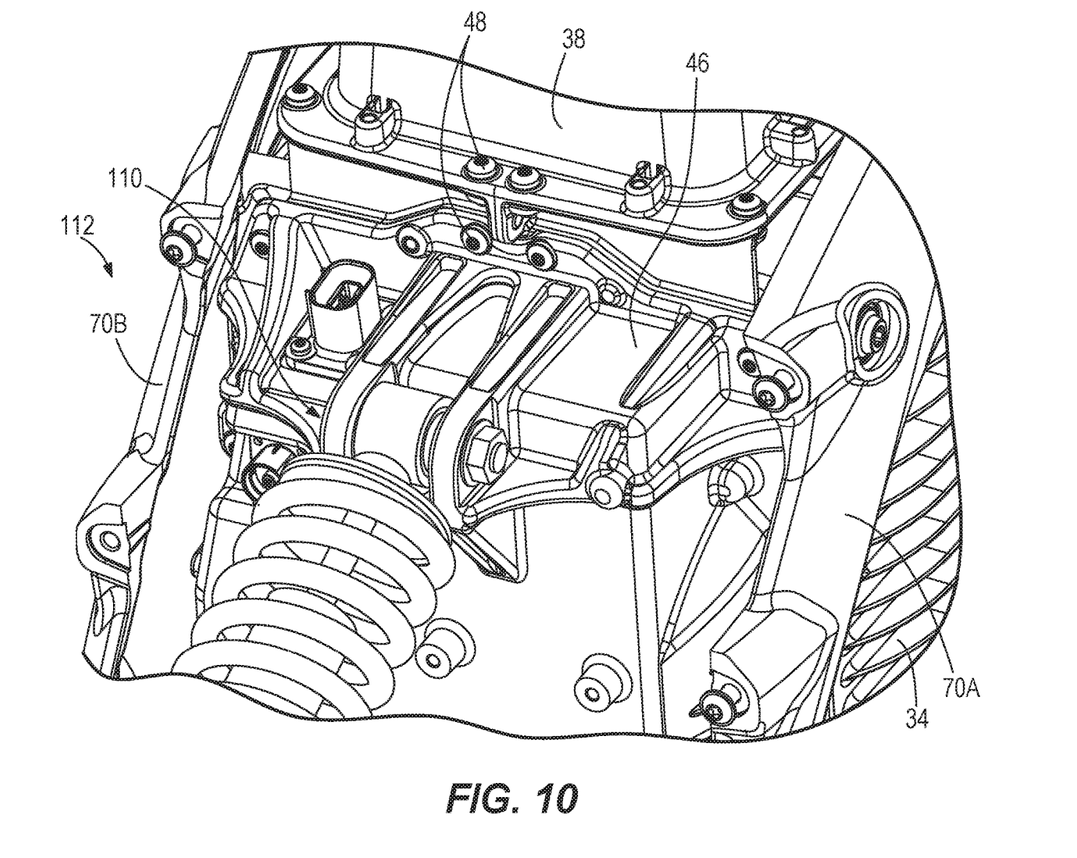
FIG. 10 is a perspective view of a shock mount positioned on a rear of the battery housing of FIG. 1.

With reference to FIGS. 9-10, the electric vehicle subassembly includes a shock mount 110. The shock mount 110 is configured to support a rear shock 112 coupled to the swingarm 102. The illustrated shock mount 110 is formed by the rear portion 46 of the battery housing 14. Specifically, the shock mount 110 is integrated with the battery housing 14 (e.g., the rear side 46). In other words, the shock mount 110 is formed as an integral extension from the rear side 42F of the battery housing 14. This may eliminate additional assembly parts which may decrease a mass of the electric vehicle 10. Furthermore, the shock mount 110 provides a path along which a load is directed to the battery housing 14. Subsequently, the load may be directed to the frame 22 coupled to the battery housing 14. As such, the shock mount 110 may be configured to direct the load from the battery housing 14 into the frame 22 during operation of the vehicle.

The following paragraphs relate to assembly of the electric vehicle 10, and in particular, features of the battery housing 14 and the motor housing 18 that facilitate assembly of the battery housing 14 and the motor housing 18 together.

Figure 5:
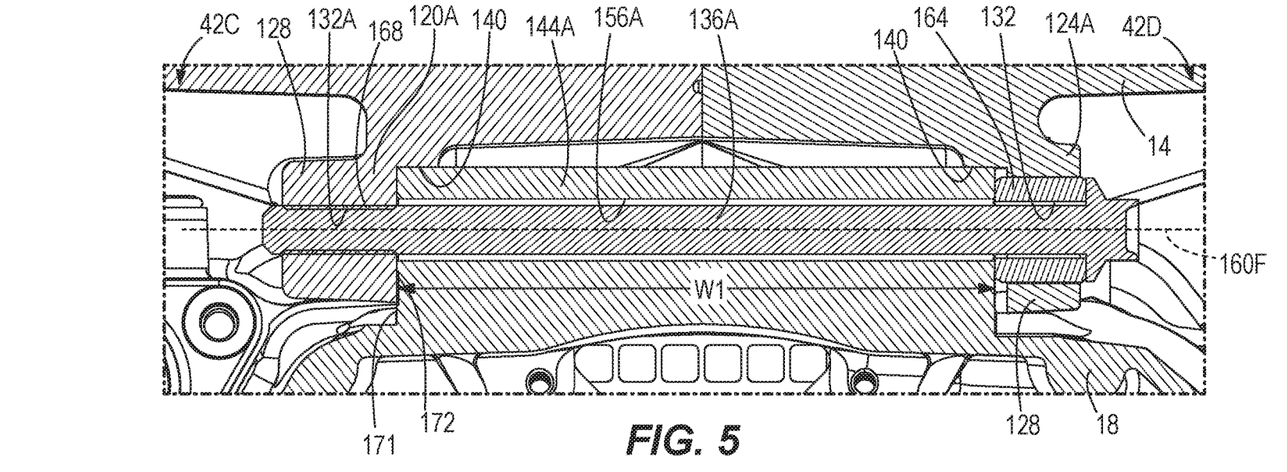
FIG. 5 is a cross-sectional view of a connection between the battery housing and the motor housing at a front of the electric vehicle subassembly.
Figure 6:
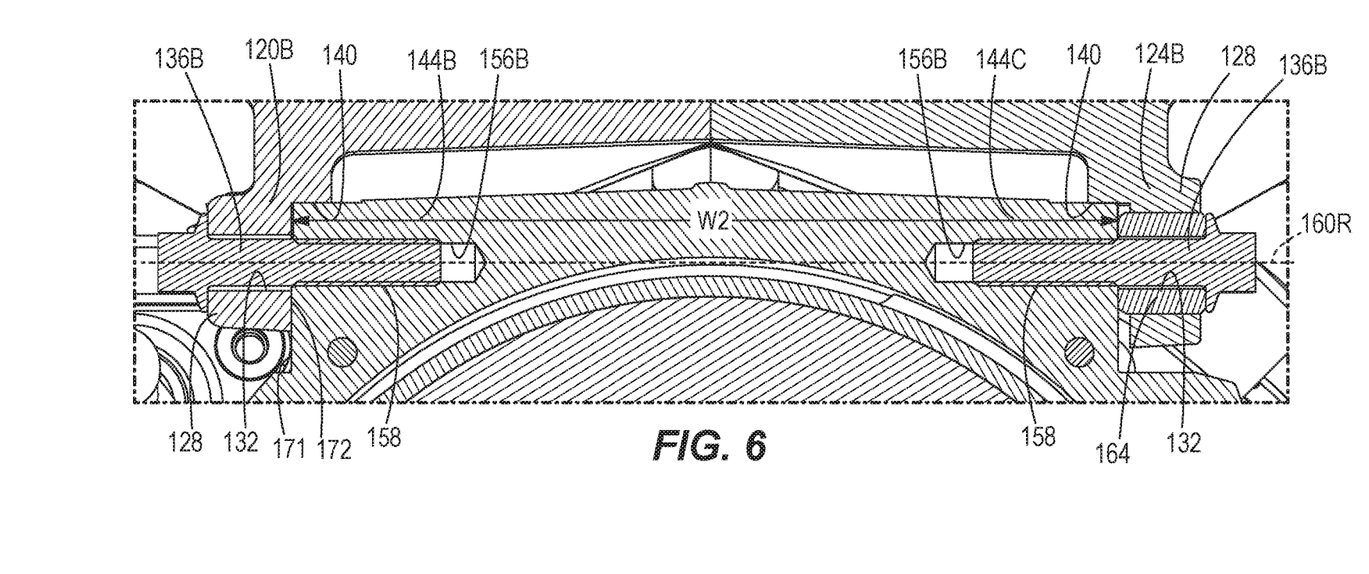
FIG. 6 is a cross-sectional view of a connection between the battery housing and the motor housing at a rear side of the electric vehicle subassembly.

With reference to FIGS. 2, 5 and 6, the battery housing 14 includes a plurality of projections 120A-B, 124A-B. The illustrated battery housing 14 includes a plurality of first projections 120A-B and a plurality of second projections 124A-B extending from the bottom side 42B (only the first set of projections 120A-B is shown in FIG. 2). The plurality of first and second projections 120A-B, 124A-B are positioned adjacent the first and second sides 42C, 42D, respectively, of the battery housing 14. Each projection 120A-B, 124A-B forms a flange. In the illustrated embodiment, the battery housing 14 includes two front flanges 120A, 124A positioned proximate (i.e., closer to) the front side 42E, and two rear flanges 120B, 124B positioned proximate the rear side 42F.

Figure 3:
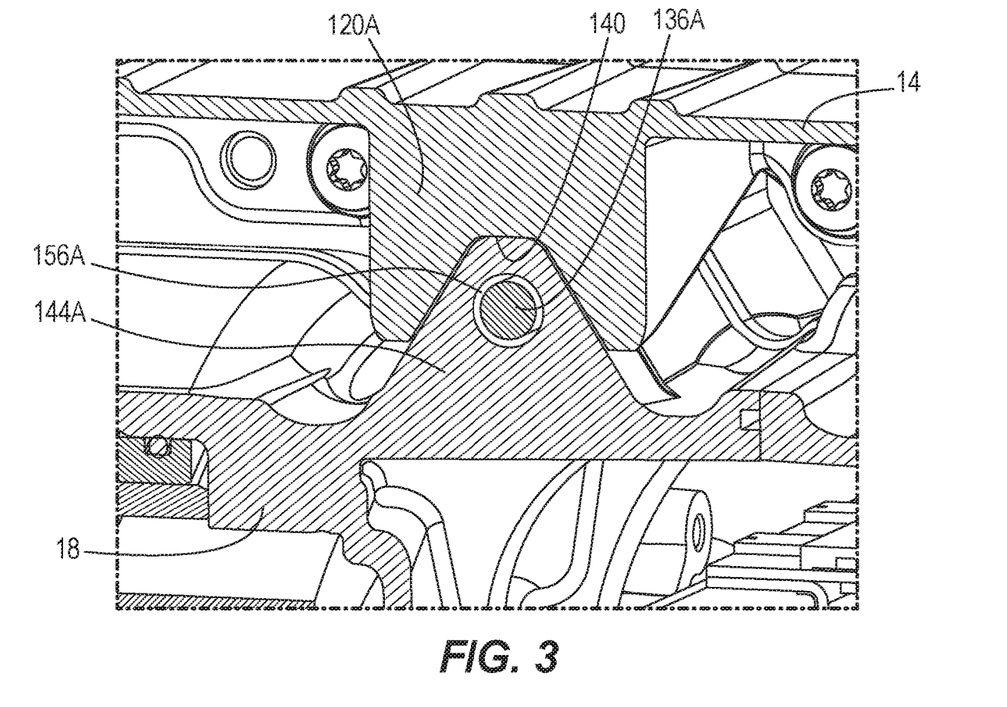
FIG. 3 is a cross-sectional view of a connection between the battery housing and the motor housing at a front side of the electric vehicle subassembly.
Figure 4:
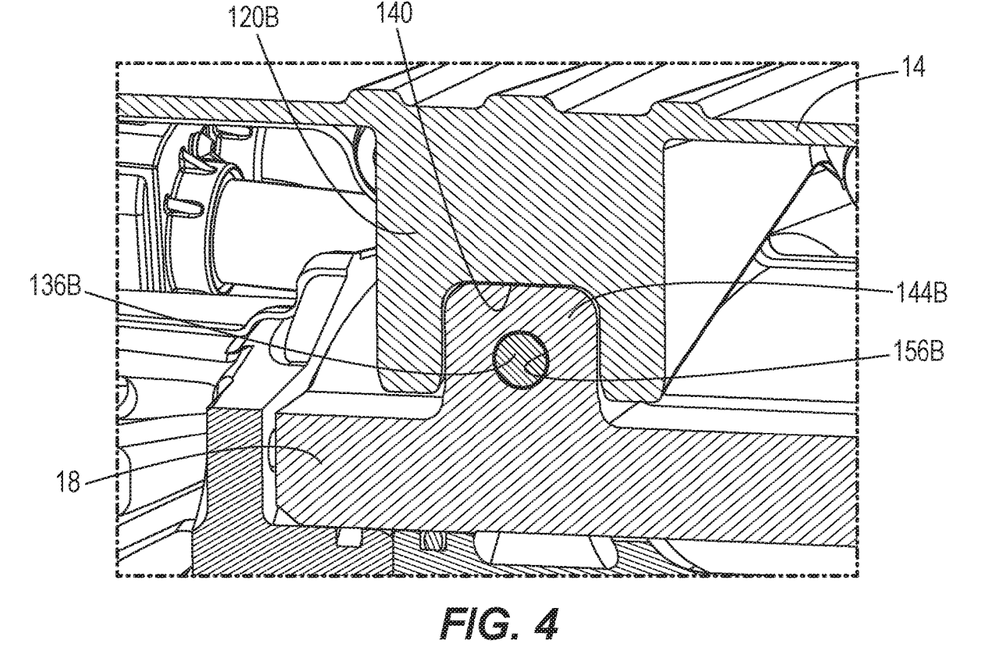
FIG. 4 is a cross-sectional view of a connection between the battery housing and the motor housing at a rear side of the electric vehicle subassembly.

With reference to FIGS. 5-6, each projection 120A-B, 124A-B includes an annular portion 128 on the first and second sides 42C, 42D. An opening 132, 132A extends through each annular portion 128. Some or all of the openings 132, 132A may including threads 168 for receiving a fastener (e.g., bolt 136A, 136B). For example, the opening 132A of the front left annular portion 128 (shown on left side of FIG. 5) includes threads 168 for receiving the fastener 136A. With reference to FIGS. 3-4, each projection 120A-B, 124A-B defines a channel 140 extending from the annular portion 128 in a direction perpendicular to the longitudinal axis 54. The illustrated channels 140 extend from the one of the front or rear flanges 120A, 124A toward the other of the front and rear flanges 120B, 124B, respectively. For example, as shown in FIG. 3, the channel 140 of the front flange 120A on the first side 42C of the battery housing 14 extends toward the other front flange 124A on the second side 42D of the battery housing 14.

With reference to FIGS. 3-6, the motor housing 18 includes a plurality of third projections 144A-C. In the illustrated embodiment, the motor housing includes three projections 144A-C extending from a top 148 of the motor housing 18 toward the battery housing 14. In other embodiments, the motor housing 18 may include one or more projections. Each projection 144A-C forms a mount. The illustrated motor housing 18 includes a front mount 144A proximate the first end 50A of the motor housing 18 and two rear mounts 144B, 144C proximate the second end 50B of the motor housing 18, and the first and second sides 42C-42D of the battery housing 14. Furthermore, the front mount 144A extends along a width of the motor housing 18 in a direction perpendicular to the longitudinal axis 54, and the rear mounts extend only partially along the width.

With reference to FIGS. 3-4, the plurality of first and second projections 120A-B, 124A-B are engageable with the plurality of third projections 144A-C. In other words, the plurality of first and second projections 120A-B, 124A-B are mountable to the plurality of third projections 144A-C. Specifically, the front and rear mounts 144A-C are receivable with the respective channel 140 of the front and rear flanges 120A-B, 124A-B, respectively. For example, as shown in FIG. 3, the channel 140 of the front flange 120A on the first side 42C of the battery housing 14 receives a portion of the front mount 144A on the motor housing 14. As shown in FIG. 4, the channel 140 of the rear flange 120B on the first side 42C of the battery housing 14 receives a portion of one of the rear mounts 144B, 144C on the motor housing 18. Accordingly, the channel 140 of the first and second projections 120A-120B, 124A-124B and the respective mount 144A-144C form a joint between the battery housing 14 and the motor housing 18.

The plurality of first, second, and third projections 120A-B, 124A-B, 144A-C are shaped for automatically locating the battery housing 14 onto the motor housing 18 at a predetermined fixed position in the front-to-rear direction. Specifically, the front and rear mounts 144A-C form a protruding shape that is received within the respective channel 140 having a complementary shape to receive the protruding shape. For example, as shown in FIG. 3, the front mount 144A has a tapered cross-sectional shape, and each of the front flanges 120A, 124A (i.e., one of each of the plurality of first and second projections) has a complementary shape to receive the front mount 144A. More specifically, the front mount 144A has a truncated pyramid cross-sectional shape. As shown in FIG. 4, one of the rear mounts 144B, 144C has a generally rectangular cross-sectional shape, and the rear flanges 120B, 124B has a complementary shape to receive the respective rear mount 144B, 144C. More specifically, the rear mount 144B has a cross-sectional shape having linear sides including two opposite sides that are parallel. An additional side, which is the top side, extends between the two opposite sides perpendicular thereto. A rounded corner connects each pair of adjacent sides. In other embodiments, the front and rear mounts 144A-C may have the same or different shapes. Furthermore, in other embodiments, the front and rear mounts 144A, 144B, 144C may include the receiving complementary shape (i.e., the channels) and the first and second projections 120A-B, 124A-B each have the complementary protruding shape receivable within the respective channel.

The battery housing 14 is positioned on top of (i.e., lowered onto in a vertical direction) the motor housing 18. The first and second projections 120A-B, 124A-B and the mounts 144A-144C locate the battery housing 14 onto the motor housing 18 at the predetermined fixed position along the front-to-rear direction. For example, as shown in FIG. 1, the front side 42E of the battery housing 14 extends past an end of the inverter/controller housing 58 along the longitudinal axis 54, and the rear side 42F of the battery housing 14 aligns with an end of the gear box housing 62. The mount 144A-144C is received in the respective channel 140 of the first and second projections 120A-B, 124A-B when the battery housing 14 is lowered onto the motor housing 18 such that the desired alignment between the battery housing 14 and the motor housing 18 as described and illustrated is achieved. The battery housing 14 rests on top of the motor housing 18 such that the battery housing 14 is supported by the motor housing 18. In other embodiments, the battery housing 14 may be positioned at other predetermined fixed positions along the front-to-rear direction. For example, the front side 42E of the battery housing 14 may be aligned with the end of the inverter/controller housing 58. The positioning of the battery housing 14 onto the motor housing 18, prior to any fastener attachment, also automatically sets a rough side-to-side positioning therebetween, by way of the front and rear mounts 144A-C being received within the respective channels 140 on the bottom of the battery housing 14. However, this relative side-to-side positioning is adjustable as described in further detail below.

More specifically, during assembly of the electric vehicle 10, when coupling the battery housing 14 and the motor housing together 18, movement or degree of freedom between the battery housing 14 and the motor housing 18 is limited in the front-to-rear direction when the first and second projections 120A-120B, 124A-124B receive the mounts 144A-144C. The battery housing 14 is still capable of moving along the mounts 144A-144C of the motor housing 18 in a side-to-side direction that is perpendicular to both the vertical and front-to-rear directions (i.e., a width of the electric vehicle 10).

With reference to FIGS. 5-6, the annular portion 128 of each of the first and second projections 120A-B, 124A-B is adjacent the respective third projection 144A-C (i.e., an end of the front and rear mounts) when the battery housing 14 is positioned on the motor housing 18. In the front (FIG. 5), the openings 132, 132A of the annular portions 128 align with an opening 156A extending through the front mount 144A. In the rear (FIG. 6), the openings 132 of the annular portions 128 align with the openings 156B of the respective rear mounts 144B, 144C. One bolt 136A is positioned to extend through the respective openings 132, 132A, 156A at the front mounting, and two individual bolts 136B are positioned to extend through the respective openings 132, 156B at each of the left and right sides of the rear mounting. Once the bolts 136A, 136B are installed, freedom of movement between the battery housing 14 and the motor housing 18 in the vertical direction is removed. However, fine adjustment in the side-to-side direction is still possible as described below.

With continued reference to FIGS. 5-6, each of the projections 124A, 124B includes a set screw 164. In the illustrated embodiment, each of the front and rear flanges 124A, 124B are on the second side 42D of the battery housing 14 (i.e., the plurality of second projections) includes the set screw 164. Specifically, the set screw 164 is positioned within the respective annular portion 128 of the respective projection 124, 124B. As such, each set screw 164 forms a portion of the respective annular portion 128 of the projections 124A, 124B. Furthermore, the set screw 164 is threaded into the respective annular portion 128 of the projections 124A, 124B such that the set screw 164 is configured to rotate along threads within the respective annular portion 128. The set screw 164 is annular or hollow such that the respective bolts 136A, 136B extend therethrough. Further, an inner surface of the set screw 164 is not threaded. Alternatively, in other embodiments, one or more of the set screws 164 can be positioned in the mount(s) 144A-C of the motor housing 18. In any case, the set screws 164 are positioned at joints formed between the battery housing 14 and the motor housing 18 at the respective projections 120A-B, 124A-B, 144A-C.

In the illustrated embodiment, the bolts 136A, 136B are positioned in the respective openings 156A, 156B for coupling the battery housing 14 and the motor housing 18 together. For example, as shown in FIG. 5, the front bolt 136A is inserted through the set screw 164, the annular portion 128 of the front flange 124A, and the opening 156A of the front mount 144A, and threads into the opening 132A of the front flange 120A positioned on the first side 42C. Thus, the opening 156A is simply a through hole with clearance for the bolt 136A. However, other arrangements are optional, such as that for the rear bolts 136B, which thread into the openings 156B of the motor housing 18. In particular, as shown in FIG. 6, each opening 156B includes threads 158 such that the respective bolt 136B extends through the opening 132 of the annular portion 128, and engages the threads 158 of the respective opening 156B. Furthermore, one of the rear bolts 136B also extends through the set screw 164 (e.g., on the rear right annular portion 128) as shown in FIG. 6. The bolting arrangements for the front and rear connections can be reversed in other constructions, just as it is also considered to use either of the illustrated front or rear bolting arrangement for both of the front and rear connections. The bolts 136A, 136B extend along respective front and rear fastener axes 160F, 160R, which as illustrated are each perpendicular to the longitudinal axis 54. The axes 160F, 160R define the lengthwise insertion or assembly direction of the bolts 136A, 136B, respectively. The fastener axes 160F, 160R extend to define the side-to-side direction of the electric vehicle 10.

A relative positioning between the battery housing 14 and the motor housing 18 is adjustable in the side-to-side direction. Specifically, the set screw 164 provides a tolerance adjustment mechanism that is adjustable separate from a fastener torque of the fasteners 136A, 136B to adjust the position of the battery housing 14 relative to the motor housing 18 along the side-to-side direction. Rotation of the set screw 164 adjusts a position of the set screw 164 (i.e., an end face thereof, which engages with the respective motor housing mounts 144A-C) within the annular portion 128 along the fastener axis 160. The tolerance adjustment mechanism may be used for adjusting an alignment between the battery housing 14 and the motor housing 18 once the battery housing 14 has been positioned on the motor housing 18 and prior to final tightening of the bolts 136A, 136B through the first, second, and third projections 120A-B, 124A-B, 144A-C. In other words, the alignment between the battery housing 14 and the motor housing 18 may be adjusted along the side-to-side direction by the set screws 164 before torque is applied to the bolts 136A, 136B for tightening the connection between the battery and motor housings 14, 18.

Specifically, the set screws 164 allow width adjustment of a width W1, W2 of the respective front and rear channels 140 to match the width defined by the front mount 144A and the width defined by the outer edges of the rear mounts 144B, 144C, respectively. Said another way, the set screws 164 changes the effective width W1, W2 of the respective channels 140 by moving the inner lateral surfaces of the set screws 164, which form one end of each of the channels 140, along the side-to-side direction. As such, the battery housing 14 can be manufactured with a widthwise clearance that is adjusted for matching the width of the motor housing 18 in the side-to-side direction. In particular, the battery housing 14 can be manufactured with the channels 140 oversized without having to stress or bend the projections 120A-B, 124A-B upon torqueing of the bolts 136A, 136B. In the illustrated embodiment, the projections 124A, 124B on the second side 42D each include the set screw 164 such that the set screws 164 are adjusted together (e.g., the same number of rotations). This shifts the battery housing 14 along the side-to-side direction. As such, the tolerance adjustment mechanism limits the degree of freedom between the battery housing 14 and the motor housing 18 in the side-to-side direction. Furthermore, the battery housing 14 may form a lateral tilt angle with respect to the longitudinal axis 54 when initially positioned on the motor housing 18. One or both of the set screws 164 may be adjusted (e.g., by different numbers of rotation) to set a desired tilt angle (e.g., zero degrees).

In the illustrated embodiment, the rear bolts 136B are inserted through the respective annular portion 128 and threaded into the opening 156B defined by the respective rear mount 144B, 144C once the battery housing 14 is positioned on the motor housing 18. The set screws 164 of the front and rear flanges 124A, 124B on the second side 42D are adjusted (e.g., tightened) to pull the battery housing 14 toward a side (e.g., right side 42D) of the electric vehicle 10 along the side-to-side direction. This may reduce or eliminate a side-to-side gap or end play in the connection or joint between the battery and motor housings 14, 18. This may also align machined surfaces 171 of the motor housing 18 (i.e., machined motor pads) to machined surfaces 172 of the batter housing 14 (i.e., machined mount lugs) on the first side 42C of the battery housing 14 which is configured to set the alignment between the battery and motor housings 14, 18. Finally, the bolt 136A is inserted into the front flange 124A on the second side 42D and the front mount 144A, and through the front flange 120A on the first side 42C. The bolt 136A is torqued to complete the coupling between the battery and motor housings 14, 18.

The first, second, and third projections 120A-B, 124A-B, 144A-C, and the set screws 164 are configured to manage the tolerance variations between the battery housing 14 and the motor housing 18. In addition, the first, second, and third projections 120A-B, 124A-B, 144A-C, and the set screws 164 are configured to eliminate the gap in the mounting stack-up between the battery housing 14 and the motor housing 18 prior to the bolts 136A, 136B being installed. This may result in the elimination of assembly stress in the battery housing 14. The set screws 164 may be preinstalled within the battery housing 14.

The following paragraphs relate to assembly of the electric vehicle 10, and in particular, features of the battery housing 14 and the frame 22 that facilitate assembly of the battery housing 14, the frame 22, and the pivot shaft stack-up 26 together.

Figure 8:
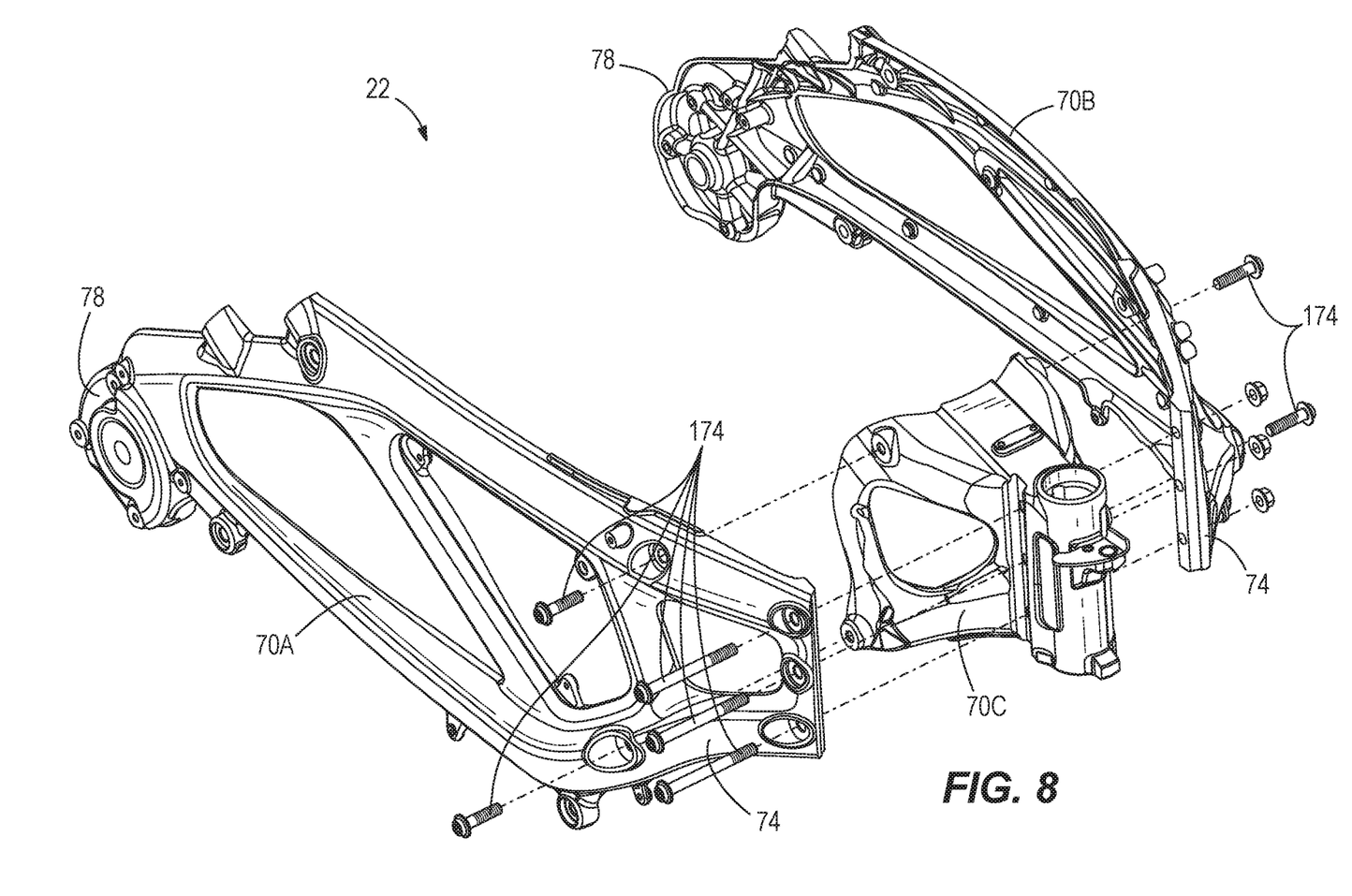
FIG. 8 is an exploded view of the frame of FIG. 7.

With reference to FIGS. 7-8, the intermediate portion 70C of the frame 22 is coupled to the front end portions 74 of the first and second side portions 70A, 70B. Fasteners, such as bolts 174, are used to couple the intermediate portion 70C to the first and second side portions 70A, 70B. A torque may be applied to the fasteners 174 until a connection between the intermediate portion 70C and the first and second side portions 70A, 70B is formed.

With reference to FIGS. 1, 8, and 9, the frame 22 is coupled to the battery housing 14. Specifically, each of the first and second sides 42C, 42D of the battery housing 14 defines apertures 176A-C (FIG. 9). In the illustrated embodiment, only the first side 42C is shown which includes three apertures 176A-C. A first aperture 176A is positioned adjacent the front side 42E and proximate the top side 42A. Second and third apertures 176B, 176C are positioned adjacent the rear side 42F and proximate the top and bottom sides 42A, 42B, respectively. The first and second side portions 70A, 70B of the frame 22 are securely attachable to the first and second sides 42C, 42D, respectively, of the battery housing 14 such as by fasteners (e.g., bolts 180; FIG. 1) insertable into the apertures 176A-C.

In operation, in a first step, the inverter/controller housing 58 and the gear box housing 62 is positioned on each end 50A, 50B of the motor housing 18. The battery housing 14 is lowered onto the motor housing 18. The plurality of first and second projections 120A-B, 124A-B automatically locates the battery housing 14 onto the plurality of third projections 144A-C of the motor housing 18 at the predetermined fixed position in the front-to-rear direction. Subsequently, the bolts 136B are inserted into the rear flanges 120B, 124B and mounts 144B, 144C. The set screws 164 on the second side 42D are threaded in or out to adjust the position of the battery housing 14 onto the motor housing 18 in the side-to-side direction. The bolt 136A is inserted into the front mount 144A such that the coupling between the battery and motor housings 14, 18 is completed.

In a second step, the idler bracket 86 is loosely assembled to the gear box housing 62 once the coupling between the battery and motor housings 14, 18 is set. This may ensure that the pivot shaft 82 will align through the pivot shaft stack-up 26 after the frame 22 is assembled to the battery housing 14.

In a third step, the frame 22 (i.e., the first side portion 70A, the second side portion 70B, and the intermediate portion 70C) is positioned around the battery housing 14. Subsequently, the frame 22 is loosely coupled to the battery housing 14 by fastening the first and second side portions 70A, 70B to the battery housing 14 with the fasteners 180, without completely tightening the fasteners 180. Specifically, the fasteners 180 are not assembled to their full depth or final torque within the respective apertures 176A-C. As such, the connection is not completely tightened between the frame 22 and the battery housing 14. The intermediate portion 70C is at least partially coupled to the first and second side portions 70A, 70B before the frame 22 is positioned around the battery housing 14.

In a fourth step, the connection between the first and second side portions 70A, 70B and the intermediate portion 70C is tightened by tightening the fasteners 174. This sets an alignment of the steering system (e.g., the steering head relative to the battery housing 14).

In a fifth step, the pivot shaft stack-up 26 is positioned adjacent the rear side 42F of the battery housing 14. Subsequently, the pivot shaft 82 is inserted through the pivot shaft stack-up 26. Specifically, the pivot shaft 82 is installed through the idler sprocket 98, the idler bracket 86, the swingarm 102, and the rear end portions 78 of each of the first and second side portions 70A, 70B of the frame 22. This sets a frame alignment of the electric vehicle 10 by aligning the first and second side portions 70A, 70B of the frame 22 to the gear box housing 62 and thus, the motor housing 18.

In a sixth step, the coupling between the frame 22 and the battery housing 14 is tightened by applying a further torque to the bolts 180. For example, torque is applied by a tool to the previously loosely-installed bolts 180 to achieve a predetermined final assembly torque. This sets the alignment between the chassis, including the frame 22, to the previously-secured subassembly of the battery housing 14 and the electric vehicle powertrain (including at least the motor and gearbox as illustrated).

The setting of the different alignments of the electric vehicle 10 facilitates assembly of the electric vehicle 10. Furthermore, the described assembly may minimize the mass and a chassis width of the electric vehicle 10 by using the battery housing 14 as a stressed chassis member in which each of the motor housing 18, the frame 22, and the pivot shaft stack-up 26 are aligned relative to the battery housing 14. As such, loads created during operation of the electric vehicle 10 are distributed along the desired paths throughout the electric vehicle 10. In addition, the described assembly provides a beneficial stiffness to weight ratio for the overall electric vehicle structure. This may enable improved vehicle handling performance.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. An electric vehicle comprising:
   a battery including a housing having a plurality of sides, the plurality of sides including a rear side, the rear side being defined as a side facing away from a forward travelling direction of the electric vehicle;
   a frame including at least one frame member coupled to the battery housing;
   a motor and gear box positioned below the battery, the motor including a housing;
   a pivot shaft stack-up assembly co-aligned along a pivot shaft axis, the pivot shaft stack-up assembly including first and second portions of the frame, and a swingarm extending therebetween;
   a pivot shaft extending through the pivot shaft stack-up assembly along the pivot shaft axis for supporting the swing arm; and
   a shock mount formed as an integral extension from the rear side of the battery housing to support a rear shock coupled to the swingarm,
   wherein the battery housing is configured as a stressed chassis member, the shock mount providing a path along which loads from the rear shock are directed to the battery housing.

2. The electric vehicle of claim 1, wherein the battery housing is coupled to the at least one frame member at a plurality of predetermined positions, all of which are spaced from the shock mount so that loads from the rear shock are transmitted through the battery housing to the at least one frame member.

3. The electric vehicle of claim 1, wherein the motor housing includes a plurality of projections extending from the motor housing toward the battery housing and fitting into the battery housing at a bottom side thereof to position the motor housing with respect to the battery housing.

4. An electric vehicle comprising:
   a battery including a housing at least partially enclosing the battery, the battery housing including a bottom side, and the battery housing including a first projection extending from the battery housing; and
   a motor having an output defining a longitudinal axis, a housing of the motor including a second projection extending from the housing toward the battery,
   wherein the longitudinal axis is parallel to a front-to-rear direction of the electric vehicle, and
   wherein the first projection engages with the second projection during assembly such that the battery housing is automatically located onto the motor housing at a predetermined fixed position in the front-to-rear direction.

5. The electric vehicle of claim 4, wherein one of the first projection and the second projection defines a channel, wherein the other of the first projection and the second projection forms a mount receivable within the channel, and wherein the channel and the mount form a joint between the battery housing and the motor housing.

6. The electric vehicle of claim 4, wherein one of the first and second projections has a protruding shape, and the other one of the first and second projections has a complementary shape to receive the protruding shape for the automatic location of the battery housing onto the motor housing at the predetermined fixed position in the front-to-rear direction.

7. The electric vehicle of claim 4, further comprising a fastener insertable through the first projection and the second projection along a fastener axis that is perpendicular to the longitudinal axis.

8. The electric vehicle of claim 7, further comprising a set screw positioned at a joint formed between the first projection and the second projection, wherein the fastener axis defines a side-to-side direction of the electric vehicle, wherein the set screw provides a tolerance adjustment mechanism that is adjustable for adjusting a width of the battery housing relative to a width of the motor housing in the side-to-side direction, and wherein the tolerance adjustment mechanism is separate from a fastener torque of the fastener.

9. The electric vehicle of claim 8, wherein the tolerance adjustment mechanism is adjustable to limit a degree of freedom of the battery housing relative to the motor housing in the side-to-side direction.

10. The electric vehicle of claim 4, wherein the engagement between the first projection and the second projection limits a degree of freedom of the battery housing relative to the motor housing in at least the front-to-rear direction.

11. The electric vehicle of claim 4, wherein the battery housing includes a first side and a second side opposite the first side, the bottom side extending between the first side and the second side, wherein the battery housing includes a front side and a rear side opposite the front side, the bottom side extending between the front side and the rear side,
   wherein the first projection is one of a plurality of first projections, the plurality of first projections including,
      a front flange positioned proximate the front side, and adjacent the first side,
      a rear flange positioned proximate the rear side, and adjacent the first side,
   wherein the battery housing includes a plurality of second projections, the plurality of second projections including,
      a front flange positioned proximate the front side, and adjacent the second side,
      a rear flange positioned proximate the rear side, and adjacent the second side,
   wherein the second projection is one of a plurality of third projections, the plurality of third projections including,
      one front mount positioned proximate the front side, and
      one rear mount positioned proximate the rear side,
   wherein the two front flanges are mountable to the front mount, and
   wherein the two rear flanges are mountable to the rear mount.

12. An electric vehicle comprising:
   a battery including a housing at least partially enclosing the battery, the battery housing including a bottom side, and the battery housing including a first projection extending from the battery housing;
   a motor having an output defining a longitudinal axis, a housing of the motor including a second projection extending from the housing toward the battery;

a set screw positioned at a joint formed between the first and second projections; and a fastener insertable through the first projection and the second projection along a fastener axis that is perpendicular to the longitudinal axis, wherein the longitudinal axis is parallel to a front-to-rear direction of the electric vehicle, and the fastener axis defines a side-to-side direction of the electric vehicle, wherein the set screw provides a tolerance adjustment mechanism that is adjustable for adjusting a width of the battery housing relative to a width of the motor housing in the side-to-side direction, and wherein the tolerance adjustment mechanism is separate from a fastener torque of the fastener.

13. The electric vehicle of claim 12, wherein one of the first projection and the second projection includes the set screw, and wherein the fastener extends through the set screw.

14. The electric vehicle of claim 12, wherein the first projection includes an annular portion, and wherein the set screw is positioned within the annular portion.

15. The electric vehicle of claim 14, wherein the annular portion includes threads, and wherein the set screw rotates about the fastener along the threads for adjusting the width of the battery housing.

16. The electric vehicle of claim 12, wherein the tolerance adjustment mechanism is adjustable to limit a degree of freedom of the battery housing relative to the motor housing in the side-to-side direction.

17. The electric vehicle of claim 12, wherein one of the first projection and the second projection defines a channel, wherein the other of the first projection and the second projection forms a mount receivable within the channel, and wherein the channel and the mount form a joint between the battery housing and the motor housing.

18. The electric vehicle of claim 12, wherein one of the first and second projections has a protruding shape, and the other one of the first and second projections has a complementary shape to receive the protruding shape for automatically locating the battery housing onto the motor housing at a predetermined fixed position in the front-to-rear direction.

19. The electric vehicle of claim 12, wherein the first projection engages with the second projection to limit a degree of freedom of the first projection relative to the second projection in at least the front-to-rear direction.

20. A method for assembly of an electric vehicle comprising:

providing the electric vehicle including,
a battery having a housing,
a frame including first and second side portions and an intermediate portion,
a motor and gear box positioned below the battery, and
a pivot shaft assembly having a pivot shaft, an idler sprocket, an idler bracket, and a swingarm, in a first step, positioning the frame around the battery housing and loosely coupling the frame to the battery housing by fastening at least one of the side portions to the battery housing;

in a second step, tightening a connection between the first and second side portions and the intermediate portion after the first step;

in a third step, installing the pivot shaft through the idler sprocket, the idler bracket, the swingarm, and an end of each of the first and second side portions of the frame after the second step, and in a fourth step, tightening the coupling between the frame and the battery housing after the third step.

* * * * *